(12) United States Patent
Kropp

(10) Patent No.: US 6,529,661 B2
(45) Date of Patent: Mar. 4, 2003

(54) OPTICAL FIBER FOR OPTICALLY COUPLING A LIGHT RADIATION SOURCE TO A MULTIMODE OPTICAL WAVEGUIDE, AND METHOD FOR MANUFACTURING IT

(75) Inventor: Jörg-Reinhardt Kropp, Berlin (DE)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 09/891,149

(22) Filed: Jun. 25, 2001

(65) Prior Publication Data

US 2002/0076157 A1 Jun. 20, 2002

(30) Foreign Application Priority Data

Jul. 10, 2000 (DE) .......................................... 100 33 485

(51) Int. Cl.[7] ................................................ G02B 6/26
(52) U.S. Cl. ............................. 385/38; 385/28; 385/31; 385/35; 385/124; 385/126
(58) Field of Search ............................. 385/38, 28, 31, 385/35, 124, 126

(56) References Cited

U.S. PATENT DOCUMENTS

| | | | |
|---|---|---|---|
| 4,199,222 A | | 4/1980 | Ikushima et al. |
| 4,270,134 A | | 5/1981 | Takeda et al. |
| 4,510,005 A | | 4/1985 | Nijman |
| 4,678,902 A | * | 7/1987 | Perlin ..................... 250/227.21 |
| 4,698,084 A | * | 10/1987 | Severijns et al. ............. 385/84 |
| 4,986,627 A | | 1/1991 | Boscher et al. |
| 5,434,940 A | | 7/1995 | Roff et al. |
| 5,465,314 A | | 11/1995 | Jie et al. |
| 5,479,543 A | | 12/1995 | Black |
| 5,659,644 A | * | 8/1997 | DiGiovanni et al. ......... 359/115 |
| 5,751,871 A | * | 5/1998 | Krivoshlykov et al. ...... 385/146 |
| 6,094,515 A | * | 7/2000 | Miki et al. ..................... 385/31 |
| 6,123,463 A | * | 9/2000 | Kashihara et al. ............. 385/59 |
| 6,203,660 B1 | * | 3/2001 | Unger et al. ............ 156/345.11 |
| 6,304,688 B1 | * | 10/2001 | Korn et al. .................. 385/123 |
| 6,359,920 B1 | * | 3/2002 | Jewell et al. .................. 372/45 |

FOREIGN PATENT DOCUMENTS

| | | |
|---|---|---|
| EP | 0 722 105 | 7/1996 |
| GB | 1 435 523 | 5/1976 |
| JP | 11242129 A | 9/1999 |
| JP | 11242129 | 9/1999 |

\* cited by examiner

Primary Examiner—Brian Healy
Assistant Examiner—Daniel Petkovsek
(74) Attorney, Agent, or Firm—Welsh & Katz, Ltd.

(57) ABSTRACT

Optical fiber for optically coupling a light radiation source to a multimode optical waveguide, and method for manufacturing it. Optical fiber for optically coupling a light radiation source (6) to a multimode optical waveguide (7) having an optical fiber core (2) for transmitting light waves, optical fiber cladding (3) enclosing the optical fiber core (2), an injection end face (4) of the optical fiber core (2) for injecting light emitted by the light radiation source (6) into the optical fiber core (2), an extraction end face (5) of the optical fiber core (2) for extracting light from the optical fiber core (2) into the multimode optical waveguide (7), the injection end face (4) of the optical fiber core being curved spherically inward in order to widen the radiation angle of the injected light.

25 Claims, 3 Drawing Sheets

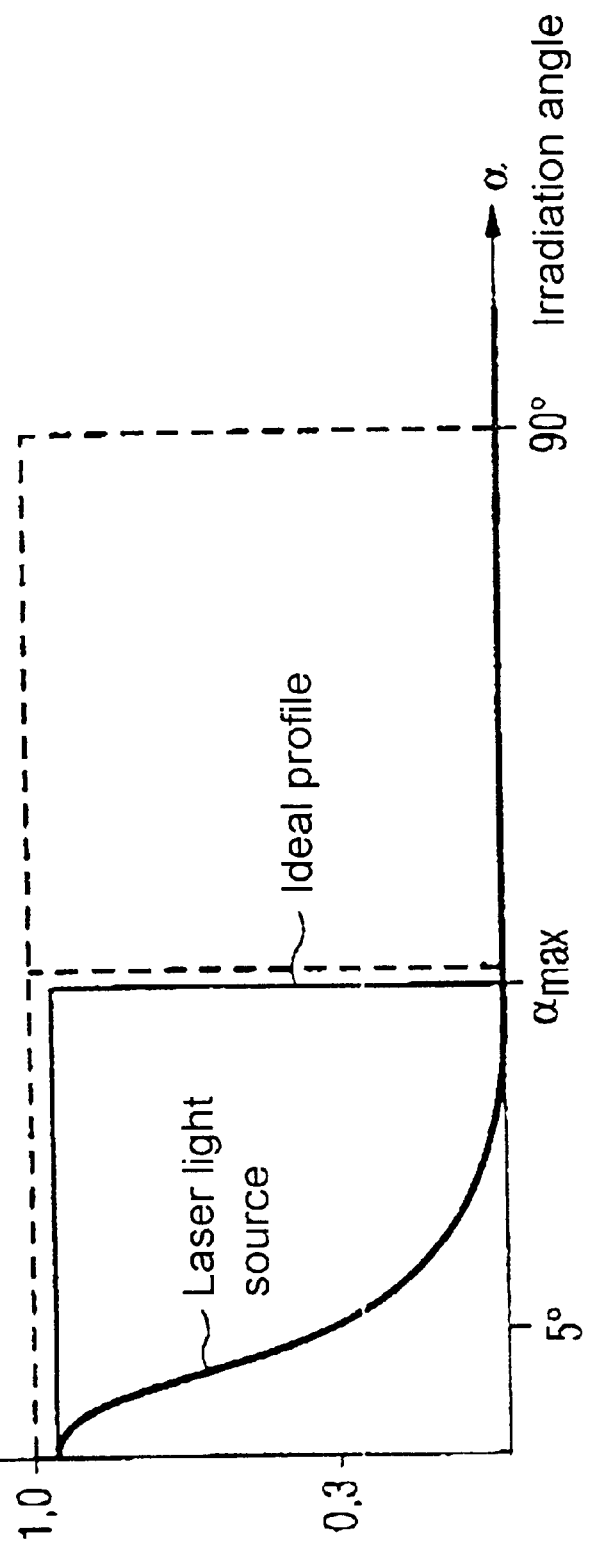

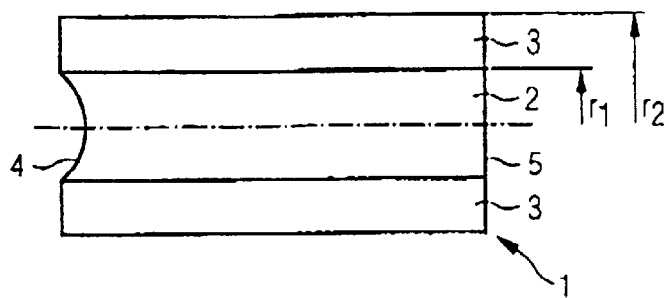
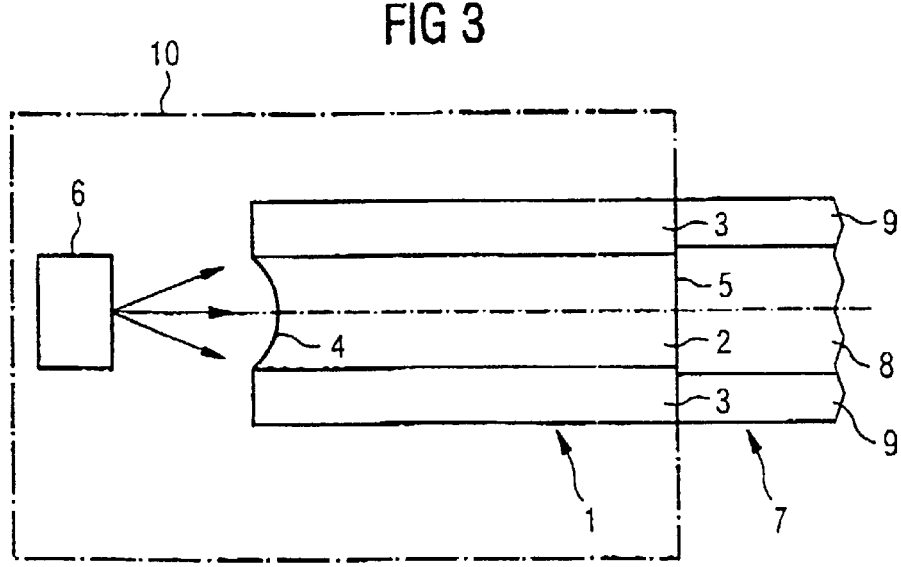

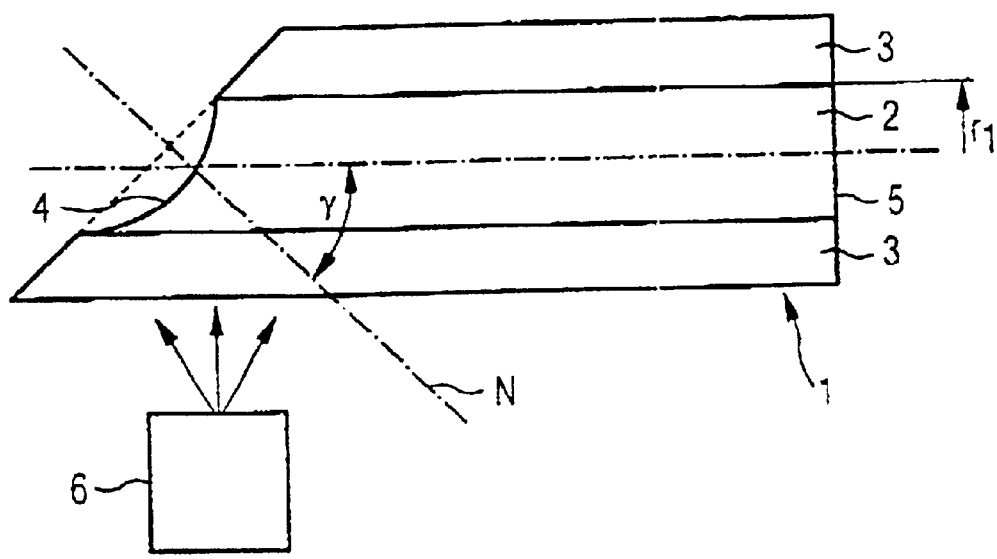
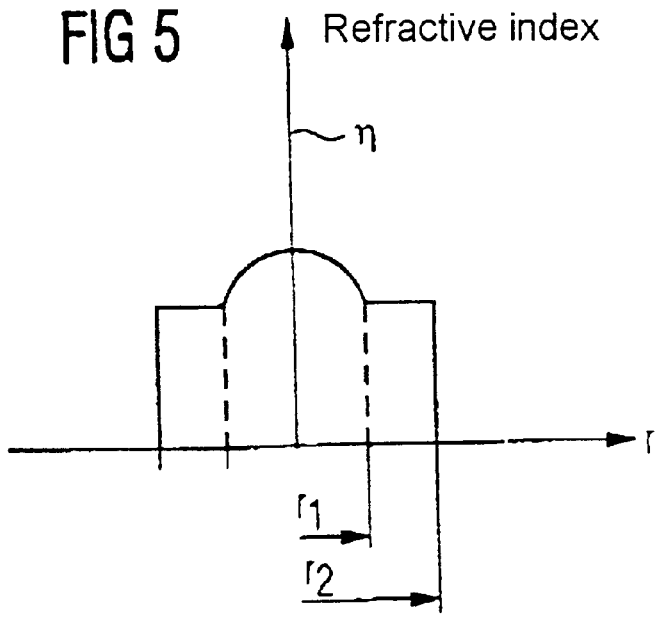

OPTICAL FIBER FOR OPTICALLY COUPLING A LIGHT RADIATION SOURCE TO A MULTIMODE OPTICAL WAVEGUIDE, AND METHOD FOR MANUFACTURING IT

BACKGROUND OF THE INVENTION

The invention relates to an optical fiber for optically coupling a light radiation source to a multimode optical waveguide, and a method for manufacturing it, which can be used in particular with light-emitting optoelectronic components.

In light-emitting optoelectronic components, laser diodes are increasingly being used as light radiation sources. Such lasers radiate coherent light with a high light intensity. With light with such a high light intensity there is the risk that when the emitted laser light strikes the retina of an eye it could lead to damage to the retina. For this reason, optoelectronic components which include laser light sources have to comply with certain safety standards. For a prescribed maximum light intensity, the irradiation angle must be widened in order to avoid damage to the retina.

The light emitted by the laser light source must be injected into an optical fiber for light transmission in a large number of applications. When this occurs, the largest possible proportion of the light irradiated by the laser light source should be coupled into the optical fiber core.

FIG. 1 shows the relationship between the light intensity I and the irradiation angle $\alpha$ of the laser light source. The maximum light intensity $I_{max}$ irradiated by the laser light source is prescribed by the safety standards. The maximum usable irradiation angle $\alpha_{max}$ is defined by the optical elements used, in particular by the acceptance angle of the optical fiber. A typical laser diode, for example a VCSEL laser diode, has a relatively small irradiation angle. FIG. 1 also shows the ideal profile for the injection of irradiated light into the multimode optical waveguide. This ideal profile is defined by the maximum light intensity and the maximum usable irradiation angle $\alpha_{max}$. In order to achieve good optical coupling between the light radiation source and the multimode optical waveguide, and on the other hand comply with the safety standards, there is therefore a need for an optical coupling array for adapting the light source to the multimode optical waveguide.

When there is direct optical coupling to a multimode optical waveguide, only partial illumination of the optical fiber core of the multimode optical waveguide is achieved. The reason for this is the relatively low mode excitation owing to the small radiation aperture of the VCSEL laser diode. When there is direct coupling to a laser light source, for example a VCSEL laser diode, without a coupling array or imaging system on a multimode optical waveguide with a graded index profile, such as is used for example for data transmission, only the modes of the lowest order are excited in the multimode optical waveguide.

Multimode optical waveguides can have a graded index profile or a stepped index profile. In contrast to multimode optical waveguides, in the case of single mode optical fibers a plurality of discrete light waves are not transmitted, but rather just one light wave with a large bandwidth. For single mode optical waveguides, it is known to perform injection by forming a lens on the end face of the single mode optical waveguide. When there is direct injection of the light emitted by the light source into the single mode optical waveguide, the portion of the light injected into the optical waveguide is increased by forming the end face of the single mode waveguide as a lens shape.

In order to increase the optical irradiation angle of the injected light in multimode optical waveguides, an optical coupling array has been proposed in which the light radiation source and the injection end face of the multimode optical waveguide are arranged with respect to one anther in such a way that the injected lightbeams extend inclined at an angle with respect to the geometric axis of the optical waveguide. However, such an optical coupling array causes the irradiation angle to be widened only if the multimode optical waveguide is a waveguide with a stepped index profile.

In contrast, short graded index waveguides have the same properties as a GRIN (graded index) lens, i.e. an injection end face which extends obliquely with respect to the lightbeams changes the angle of the radiation in the optical waveguide, but only in one direction. As a result of the imaging properties of the graded index optical waveguide, the change in angle is retained during the transmission by the optical waveguide and then emerges squinting in accordance with the angle of inclination of the injection end face. The irradiation angle is not widened here.

The object of the present invention is therefore to provide an optical fiber for optically coupling a light radiation source to a multimode optical waveguide, and a method for manufacturing it, in which optical fiber a large proportion of the light energy irradiated by the laser light source is injected into the optical waveguide and at the same time the laser safety standards are complied with.

This object is achieved according to the invention by means of an optical fiber having the features specified in patent claim 1.

The invention provides an optical fiber for optically coupling a light radiation source to a multimode optical waveguide having:

- an optical fiber core for transmitting light waves,
- optical fiber cladding enclosing the optical fiber core,
- an injection end face of the optical fiber core for injecting light emitted by the light radiation source into the optical fiber core,
- an extraction end face of the optical fiber core for extracting light from the optical fiber core into the multimode optical waveguide,
- the injection end face of the optical fiber core being curved spherically inward in order to widen the radiation angle of the injected light.

SUMMARY OF THE INVENTION

In a preferred embodiment of the optical fiber according to the invention, the injection end face of the optical fiber core is curved concavely inward.

The optical fiber core is preferably a multimode optical waveguide with a graded index profile.

The extraction end face of the optical fiber core is preferably planar.

In a preferred embodiment, the concave injection end face is rotationally symmetrical with respect to the longitudinal axis of the optical fiber core.

In a further embodiment of the optical fiber according to the invention, the concave injection end face is rotationally symmetrical with respect to an axis which extends at an angle of inclination with respect to the longitudinal axis of the optical fiber core.

The angle of inclination here is preferably 45°.

The injection end face preferably has a mirrored layer for reflecting light.

As a result, it is possible to inject the light at 90° with respect to the longitudinal axis of the optical fiber core.

The invention also provides an optoelectronic light transmitter component for multimode optical waveguides having at least one optical light radiation source for generating light, and an associated optical fiber for optically coupling the optical light radiation source to the multimode optical waveguide, the optical fiber having an optical fiber core with an injection end face which faces the light radiation source and has the purpose of injecting the generated light into the optical fiber core, and the injection end face of the optical fiber core being curved spherically inward in order to widen the radiation angle of the injected light.

In a preferred embodiment, the injection end face of the optical fiber core is curved concavely inward in order to widen the radiation of the injected light.

The optical light radiation source is preferably a laser light source.

The laser light source is preferably a laser diode.

In a particularly preferred embodiment, the laser diode is a VCSEL laser diode.

In one particularly preferred embodiment, the optical fiber core has a diameter of 62.5 μm.

The numerical aperture of the optical fiber core is preferably 0.275.

In a preferred embodiment, the injection end face has a concave curvature with a central radius of 0.3 mm.

The invention also provides a method for manufacturing an optical fiber having the following steps, specifically both end faces of a raw glass fiber which has an optical fiber core with a graded index material profile and optical fiber cladding enclosing the optical fiber core are planarized, at least one of the two end faces of the raw glass fiber is etched with an etchant, the erosion rate of which increases toward the center of the optical fiber core in a way corresponding to the graded index.

The end face of the raw glass fiber is preferably etched for a predetermined time here.

In one preferred embodiment of the method according to the invention, the erosion rate of the etchant is very low for the optical fiber cladding.

The raw glass fiber is preferably immersed into the etchant during etching.

The etchant is preferably hydrofluoric acid.

In one preferred embodiment of the manufacturing method according to the invention, the two end faces of the raw glass fiber are planarized by polishing.

In one particularly preferred embodiment of the method according to the invention, the erosion rate of the etchant in the center of the optical fiber core is approximately 1.4 μm/min.

The etchant preferably has a concentration of approximately 20%.

In one preferred embodiment of the manufacturing method according to the invention, the center of the optical fiber core is etched at the end face to an etching depth of 1–4 μm.

In addition, preferred embodiments of the optical fiber according to the invention for optically coupling a light radiation source to a multimode optical waveguide and a method for manufacturing it and an optoelectronic light transmitter component which contains the optical fiber according to the invention are described with reference to the appended drawings in order to explain features which are essential to the invention. In said drawings:

CONCISE DESCRIPTION OF THE DRAWINGS

FIG. 1 shows a diagram explaining the problems on which the invention is based;

FIG. 2 shows a first embodiment of the optical fiber according to the invention;

FIG. 3 shows the use of the optical fiber according to the invention for optically coupling a light radiation source to a multimode optical waveguide;

FIG. 4 shows a second embodiment of the optical fiber according to the invention;

FIG. 5 shows a diagram representing the graded index profile of an optical fiber according to the invention.

DETAILED DESCRIPTION OF THE DRAWINGS

FIG. 2 shows a first embodiment of the optical fiber 1 according to the invention for optically coupling a light radiation source to a multimode optical waveguide.

The optical fiber 1 has an optical fiber core 2 for transmitting light waves. The optical fiber core 2 is enclosed by optical fiber cladding 3. The optical fiber core 2 has an injection end face 4 for injecting electromagnetic waves or light. The light is emitted here by a light radiation source (not illustrated) and is injected into the optical fiber core 2 via the injection end face 4. The optical fiber core 2 also has an extraction end face 5 for extracting light from the optical fiber core in a multimode optical waveguide.

The injection end face 4 of the optical fiber core 2 serves to widen the radiation angle of the injected light. The injection end face 4 is curved spherically inward here. In the preferred embodiment illustrated in FIG. 2, the injection end face 4 is curved essentially concavely inward, the concave injection end face 4 being rotationally symmetrical with respect to the longitudinal axis of the optical fiber core 2. In one particularly preferred embodiment, the optical fiber core 2 has a diameter of 62.5 μm and has a numerical aperture of 0.275. In this particularly preferred embodiment, the concave injection end face 4 has a central curvature radius of 0.3 mm. As a result of the curvature of the injection end face 4, optimum injection with maximum illumination of the waveguide core is achieved. This permits a higher number of modes to be excited. The concave injection end face 4 of the optical fiber 1 brings about a change in the guiding of radiation in the waveguide without additional optical components being necessary.

FIG. 3 shows an arrangement in which the first embodiment (illustrated in FIG. 2) of the optical fiber according to the invention for optically coupling a light radiation source 6 to a multimode optical waveguide 7 is used. The extraction end face 5 of the optical fiber core 2 preferably bears in a planar fashion against the multimode optical waveguide 7 which has an optical fiber core 8 and optical fiber cladding 9 enclosing this optical fiber core. The optical light radiation source 6 is a laser light source which is generally formed by means of a laser diode. The light source 6 is preferably a VCSEL laser diode.

The optical fiber 1 and the optical light radiation source 6 are integrated into an optoelectronic light transmitter component 10. The optical fiber 1 is used here to optically extract the optical light radiation source 6 to the external multimode optical waveguide 7. The injection end face 4, facing the light radiation source, of the optical fiber core 2 of the optical fiber 1 serves to inject the light generated by the light radiation source 6. The optical fiber 1 ensures that the power emitted by the light radiation source 6 is transmitted into the multimode optical waveguide 7 with a very high level of efficiency. Furthermore, the optical waveguide 1 ensures that the laser safety standards are complied with, i.e. the maximum permissible irradiation power for all the irradiation angles is not exceeded.

FIG. 4 shows a further embodiment of the optical fiber 1 according to the invention. In this embodiment, the concave injection end face 4 is arranged essentially rotationally symmetrically with respect to an axis N which extends at an angle γ of inclination with respect to the longitudinal axis of the optical fiber core 2. In a preferred embodiment, the angle γ of inclination is 45°. The injection end face 4 has a light-reflecting layer which permits the light to be injected at an angle of 90° with respect to the longitudinal axis of the optical fiber.

The embodiment of the optical fiber 1 according to the invention shown in FIG. 4 permits light to be injected into the optical fiber core 2 at an angle. The optical fiber 1 represented in FIG. 4 can be used here to perform a 90° deflection of the light supplied. Here, the light is incident on the injection end face 4 of the optical fiber core at an angle of 90° with respect to the longitudinal axis of the optical fiber core 2, the injection end face 4 acting as a concave mirror and reflecting the incident light into the optical fiber core 2. Here, the light which is to be deflected and which is generated by the light radiation source 6 preferably passes through the optical fiber cladding 3 and is incident on the concave end face 4 of the optical fiber core 2 from the inside. Here, the light is reflected and transmitted to the extraction end face 5 in the glass fiber core 2.

FIG. 5 shows the profile of the refractive index within an optical fiber 1 according to the invention. The optical fiber core 2 has a diameter of 2×r1, which is preferably 62.5 μm. The refractive index within the optical fiber core has a parabolic profile. The refractive index here is at a maximum in the center of the optical fiber core 2 and drops away in a parabolic shape to the edge of the optical fiber core 2. The optical fiber cladding 3 generally has a lower refractive index, which is essentially constant.

In a particularly preferred embodiment, the numerical aperture nA of the optical fiber core is 0.275.

The following applies:

$$nA = \sin(\alpha_{max}),$$

where $\alpha_{max}$ is the maximum injection angle during the injection of light into the optical fiber core 2.

An advantage of the optical fiber 1 according to the invention is that the injection end face 4 of the optical fiber core 2 can be manufactured with a high degree of precision and yet easily.

For this purpose, a raw glass fiber is inserted into a short carrier with an inner drilled hole and is shortened on both sides of the drilled hole by breaking or cutting. The raw glass fiber stump which is shortened in this way has two end faces which are subsequently planarized. The raw glass fiber stump is then dipped into an etchant. The etchant is, for example, hydrofluoric acid HF. The raw glass fiber stumps are dipped into the etchant for a predetermined time, the etchant having a predetermined concentration of, for example, 20%. The erosion rate of the etchant is different for the optical fiber core 2 and the optical fiber cladding 3. The etchant is selected such that the erosion rate of the etchant for the optical fiber cladding 3 is considerably below the erosion rate for the optical fiber core 2. Because the optical fiber core 2 is a graded index optical waveguide with a parabolic profile of its refractive index, the chemical composition of the optical fiber core 2 is also graded. The etchant is selected such that the erosion rate increases toward the center of the optical fiber core 2. The optical fiber core 2 has a higher germanium content in its center point, for example, than at its edge.

In a preferred embodiment of the method according to the invention, the erosion rate of the etchant is approximately 1.4 μm/min in the center of the optical fiber core 2. The optical fiber 1 is placed in the etchant for a predetermined time, the optical fiber core 2 being etched at the end face 4 preferably until the center of the optical fiber core is etched to an etching depth of approximately 1 to 4 μm. In one particularly preferred embodiment, the etching depth in the center of the optical fiber core 2 is 1.6 μm with respect to the planar end face of the optical fiber cladding. This etching depth of 1.6 μm corresponds to a concave curvature with a central radius of 0.3 μm. The inventive optical fiber 1 for an optoelectronic component 10 is thus particularly easy to manufacture.

Furthermore, the optical fiber 1 according to the invention can be installed in an optoelectronic light transmitter component 10 with particular ease. The adjustment and alignment of the light radiation source 6 with respect to the optical fiber 1 according to the invention is particularly easy because the light irradiation of the light radiation source 6 extends in the longitudinal axis of the optical fiber core 2. There is therefore no need to adjust the light source with respect to the optical fiber 1.

What is claimed is:

1. An optical fiber for optically coupling a light radiation source to a multimode optical waveguide having:

an optical fiber core for transmitting light waves;

optical fiber cladding enclosing the optical fiber core;

an injection end face of the optical fiber core for injecting light emitted by the light radiation source into the optical fiber core;

an extraction end face of the optical fiber core for extracting light from the optical fiber core into the multimode optical waveguide, said injection end face of the optical fiber core being curved concavely inward in order to widen the radiation angle of the injected light, and said concave injection end face being rotationally symmetrical with respect to an axis N which extends at an angle of inclination (γ) with respect to a longitudinal axis of the optical fiber core.

2. The optical fiber as claimed in claim 1, wherein the injection end face is curved spherically inward.

3. The optical fiber as claimed in claim 1, wherein the optical fiber core is a multimode optical waveguide with a graded index profile.

4. The optical fiber as claimed in claim 1, wherein the extraction end face of the optical fiber core is planar.

5. The optical fiber as claimed in claim 1, wherein the concave injection end face is rotationally symmetrical with respect to the longitudinal axis of the optical fiber core.

6. The optical fiber as claimed in claim 1, wherein the injection face has a reflective surface and an angle of inclination of 45°.

7. An optoelectronic light transmitter component for multimode optical waveguides having:

at least one optical light radiation source for generating light and an associated optical fiber for optically coupling the optical light radiation source to the multimode optical waveguide, the optical fiber having an optical fiber core with an injection end face which faces the light radiation source and has the purpose of injecting the generated light into the optical fiber core, the injection end face of the optical fiber core being curved concavely inward in order to widen the radiation angle of the injected light, and being rotationally symmetrical with respect to an axis N which extends at an angle of inclination (γ) with respect to a longitudinal axis of the optical fiber core.

8. The optoelectronic light transmitter component as claimed in claim 7, wherein the injection end face of the optical fiber core is curved spherically inward.

9. The optoelectronic light transmitter component as claimed in claim 7, wherein the optical light radiation source is a laser light source.

10. The optoelectronic light transmitter component as claimed in claim 9, wherein the laser light source is a laser diode.

11. The optoelectronic light transmitter component as claimed in claim 10, wherein the laser diode is a VCSEL laser diode.

12. The optoelectronic light transmitter component of claim 1, wherein the optical fiber core has a planar extraction end face for extracting the light into the multimode optical waveguide.

13. The optoelectronic light transmitter component of claim 1, wherein the optical fiber core is a multimode optical waveguide with a graded index profile.

14. The optoelectronic light transmitter component of claim 1, wherein the optical fiber core has a diameter of 62.5 μm.

15. The optoelectronic light transmitter component of claim 1, wherein the numerical aperture of the optical fiber core is 0.275.

16. The optoelectronic light transmitter component of claim 1, wherein the injection end face has a concave curvature with a central radius of 0.3 mm.

17. A method for manufacturing an optical fiber having the following steps:

(a) both end faces of a raw glass fiber which has an optical fiber core with a graded index material profile and optical fiber cladding enclosing the optical fiber core are planarized;

(b) at least one of the two end faces of the raw glass fiber is etched in an etchant, the erosion rate of which increases toward the center of the optical fiber core in a way corresponding to the graded index.

18. The method as claimed in claim 17, in which the end face of the raw glass fiber is etched for a predetermined time.

19. The method of claim 17, in which the erosion rate of the etchant is low for the optical fiber cladding.

20. The method of claim 17, in which the raw glass fiber is fully immersed into the etchant for the purpose of etching.

21. The method of claim 17, in which the etchant is hydrofluoric acid HF.

22. The method of claim 17, in which the end faces of the raw glass fiber are planarized by polishing.

23. The method of claim 17, in which the erosion rate of the etchant in the center of the optical fiber core is approximately 1.4 μm/min.

24. The method of claim 17, in which the etchant has an acid concentration of approximately 20%.

25. The method of claim 17, in which the center of the optical fiber core is etched at the end face to an etching depth of 1 to 4 μm.

\* \* \* \* \*